March 24, 1925.

J. C. ROBINSON

NUT GUARD

Filed July 19, 1923

1,530,521

Inventor

Joe C. Robinson,

By

Attorneys

UNITED STATES PATENT OFFICE.

JOE C. ROBINSON, OF DETROIT, MICHIGAN.

NUT GUARD.

Application filed July 19, 1923. Serial No. 652,557.

*To all whom it may concern:*

Be it known that I, JOE C. ROBINSON, a citizen of the United States of America, residing at Detroit, in the county of Wayne and State of Michigan, have invented certain new and useful Improvements in Nut Guards, of which the following is a specification, reference being had therein to the accompanying drawings.

This invention relates to a nut guard that may be mounted on a nut to prevent a wrench or similar tool from being used to rotate a nut.

The main objects of my invention are security against theft; adaptability for use upon articles of various thickness; compactness, and simplicity of construction.

The uses of the nut guard are many but it has been especially designed to prevent removal of the nuts employed for holding the locking lugs of a tire rim on a wheel rim or felly, so that the tire rim and a tire carried thereby cannot be surreptitiously removed. It may also be used for guarding the nut employed for retaining a spare rim and tire on a tire guard.

The construction of the nut guard will be hereinafter specifically described and then claimed, and reference will now be had to the drawing, wherein—

Figure 1:
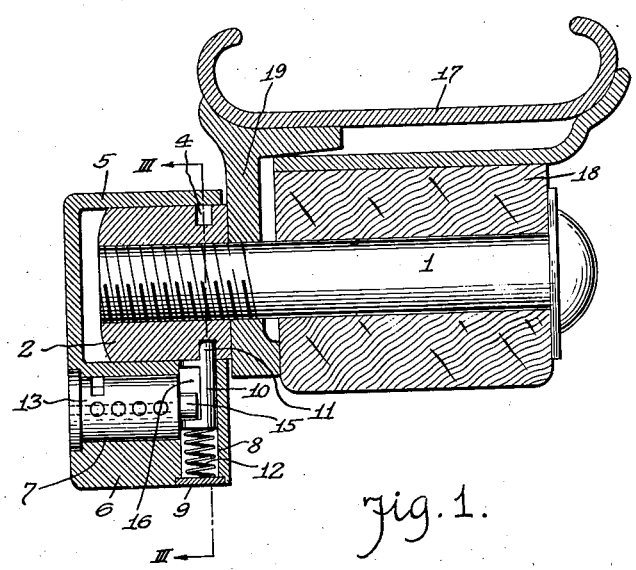
Figure 1 is a longitudinal sectional view of the nut guard on a nut supported from a wheel felly.
Figure 2:
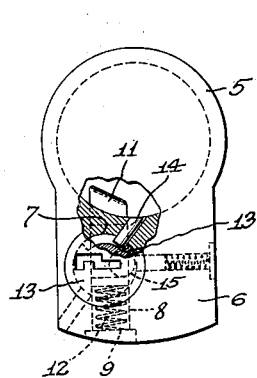
Fig. 2 is a front elevation of the nut guard partly broken away and partly in section.
Figure 3:
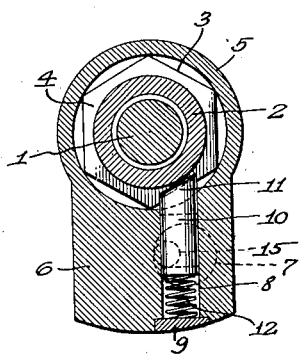
Fig. 3 is a cross sectional view taken on the line III—III of Fig. 1.

In the drawing, 1 denotes a bolt and screwed on the bolt is a nut 2 having facets 3. Adjacent the inner end of the nut 2 is an annular groove 4.

5 denotes a cylindrical housing adapted to be placed over the nut 2 to freely revolve about the facets or axis of the nut and at one side of the housing 5 is a casing 6 provided with a longitudinal bore 7 communicating with a bore 8 at a right angle to the bore 7 and the inner end of the bore 8 communicates with the housing 5, while the outer end of the bore is plugged or closed by a countersunk plate 9.

10 denotes a plunger slidable in the bore 8, said plunger having its inner end cut away to provide a tooth 11 which extends into the groove 4 of the nut 2 and prevents longitudinal movement of the housing 5 on said nut, but does not interfere with shifting of the housing 5 about the axis of the nut.

12 denotes a coiled expansion spring in the bore 8 between the outer end of the plunger 10 and the plate 9, and the expansive force of this spring retains the tooth 11 of the plunger normally in the groove 4 of the nut 2.

13 generally denotes a conventional form of key actuated lock mechanism located within the bore 7 and said lock mechanism may include an oscillatory barrel retained within the bore 7 by a pin 14 with the inner end of the barrel provided with a crank pin 15 normally extending into a recess 16 provided therefor in the side of the plunger 10. When the lock barrel is oscillated by a key inserted in the outer end of said barrel the crank pin 15 retracts the plunger 10, against the action of the spring 12, to permit of the housing 5 being removed from the nut 2.

With the housing 5 free to swing or revolve relative to the nut 2 it is obvious that a wrench or similar tool cannot be employed to rotate the nut 2 with the housing 5 thereon. The nut is therefore guarded against surreptitious removal from the bolt 1, and as illustrating my invention as security against theft of a tire rim 17, the bolt 1 extends through a wheel felly or rim 18 and a rim holding clip or lug 19. With the nut 2 clamping the clip or lug 19 against the rim or felly 18 it is obvious that the tire rim 17 cannot be removed until the nut 2 is removed from the bolt. Such cannot be accomplished until the guard is removed from the nut.

I do not care to confine my invention to any particular type of lock mechanism for shifting the plunger relative to the nut, and while in the drawing there is illustrated a preferred embodiment of my invention it is to be understood that the structural elements are susceptible to such changes as fall within the scope of the appended claim.

What I claim is:—

A nut guard comprising a cylindrical housing adapted to inclose a nut and freely shift relative to the axis of the nut, a lock casing carried by said housing, a spring pressed plunger slidable in said casing and extending into said nut and adapted to move about in the exterior walls of said nut when said guard is shifted circumferentially of the nut, said plunger preventing endwise movement of said guard, and key actuated lock mechanism in said casing adapted for retracting said plunger relative to the nut.

In testimony whereof I affix my signature in presence of two witnesses.

JOE C. ROBINSON.

Witnesses:
KARL H. BUTLER,
ANNA M. DORR.